(12) United States Patent
Lin

(10) Patent No.: US 8,273,985 B2
(45) Date of Patent: Sep. 25, 2012

(54) JUNCTION BOX

(75) Inventor: Chih-Hsin Lin, Xianxi Township, Changhua County (TW)

(73) Assignee: K.S. Terminals Inc., Changhua County (TW)

( * ) Notice: Subject to any disclaimer, the term of this patent is extended or adjusted under 35 U.S.C. 154(b) by 308 days.

(21) Appl. No.: 12/859,346

(22) Filed: Aug. 19, 2010

(65) Prior Publication Data
US 2012/0024558 A1 Feb. 2, 2012

(30) Foreign Application Priority Data
Jul. 29, 2010 (TW) .............................. 99214455 U

(51) Int. Cl.
*H05K 7/20* (2006.01)
(52) U.S. Cl. ......................... 174/50; 248/906; 439/535
(58) Field of Classification Search .................... 174/50, 174/17 R, 58; 248/906; 439/535; 220/4.02; 361/600
See application file for complete search history.

(56) References Cited

U.S. PATENT DOCUMENTS

| | | | | |
|---|---|---|---|---|
| 6,997,023 | B1 * | 2/2006 | Huang | 70/21 |
| 7,947,902 | B2 * | 5/2011 | Tang | 174/50 |
| 7,973,237 | B2 * | 7/2011 | Picard | 174/50 |
| 7,989,696 | B2 * | 8/2011 | Shi et al. | 174/50 |

* cited by examiner

*Primary Examiner* — Dhirubhai R Patel
(74) *Attorney, Agent, or Firm* — Ming Chow; Sinorica, LLC

(57) ABSTRACT

A junction box includes a base, a cover snap-fitted into the base and a ventilation valve on the cover. The ventilation valve includes a first hollow cylinder that has a first inner bore having a first thread and a bottom having an open area that includes an annular flange; a second hollow cylinder; and a waterproof air-permeable membrane. The second hollow cylinder has a second thread on an outer surface thereof, a first end, a second end and a second inner bore. The first end has an annular groove. The waterproof air-permeable membrane is disposed between the first end of the second hollow cylinder and the bottom of the first hollow cylinder. A specific distance, smaller than an axial feeding amount of the first thread when being threaded by one turn, is formed between the top of the annular flange and the top of the annular groove.

14 Claims, 5 Drawing Sheets

JUNCTION BOX

BACKGROUND OF THE INVENTION

1. Technical Field

The present invention relates to a junction box, and more particularly, to a junction box for use in a solar battery.

2. Description of Related Art

As energy sources are in short supply worldwide, many governments and people are paying more and more attention to the application of solar batteries. Because there is no worry that the solar energy will run out and no environmental pollution is generated during the production of electric energy from solar energy, the solar energy becomes a popular alternative energy source and, as a result, the solar battery industry is flourishing. However, as a single solar battery only delivers a low voltage and a small current, solar batteries have to be connected in series or in parallel via a junction box to form a larger current and a higher voltage so that satisfactory overall power generation efficiency can be obtained.

However, due to the environment where the solar batteries and the junction boxes are disposed, it is often the case that moisture permeates into the solar batteries along the junction box due to weather factors or other factors to cause short-circuits, malfunctions or even complete failure of the solar batteries. This puzzles the users and manufacturers to a great extent. Therefore, it becomes necessary to provide a junction box with a waterproof function for the solar batteries.

BRIEF SUMMARY OF THE INVENTION

In order to overcome the drawbacks of the prior art, the present invention provides a junction box, which mainly comprises a base, a cover and a ventilation valve. The cover is snap-fitted into the base, and the ventilation valve is disposed on the cover. The ventilation valve comprises a first hollow cylinder, a second hollow cylinder and a waterproof air-permeable membrane.

The first hollow cylinder is disposed on an inner surface of the cover and faces towards the base. The first hollow cylinder has a first inner bore and a bottom, with an open area being disposed on the bottom. The first inner bore is larger in area than the open area, and is formed with a first thread on a bore wall thereof. The bottom is formed with an annular flange that is protruded axially on the outside of the open area.

The second hollow cylinder is formed with a second thread on an outer surface thereof to be threaded into the first thread so that the second hollow cylinder is received in the first hollow cylinder. The second hollow cylinder has a first end, a second end and a second inner bore extending through the first end and the second end. An annular groove is formed axially at the first end corresponding to the annular flange of the first hollow cylinder, and the annular groove is larger in width than the annular flange.

The waterproof air-permeable membrane is disposed between the first end of the second hollow cylinder and the bottom of the first hollow cylinder, and is adhered to the first end of the second hollow cylinder. The annular flange includes two projections being fixed at two ends of the annular flange respectively. The projections extend into the annular groove, and a specific distance, which is smaller than an axial feeding amount of the first thread when being threaded by one turn, is formed between the top of the annular flange and the top of the annular groove.

Accordingly, a primary objective of the present invention is to provide the aforementioned junction box. As the annular flange of the first hollow cylinder of the ventilation valve and the annular groove of the second hollow cylinder are disposed axially along the outside of the open area, the waterproof air-permeable membrane can be fixed axially on the outside of the open area so that the open area is completely covered by the waterproof air-permeable membrane. Thereby, a waterproof and air-permeable effect is achieved for the junction box. In other words, the air pressure is balanced between the inside and the outside of the junction box and moisture is prevented from entering into the junction box through the open area.

A secondary objective of the present invention is to provide the aforementioned junction box. When a waterproof air-permeable membrane is disposed between a first end of a second hollow cylinder and a bottom of a first hollow cylinder, a first thread of the first hollow cylinder turns around a second thread of the second hollow cylinder to be mated with each other. Each time the first thread is threaded by one more turn, the mating between the first thread and the second thread becomes stronger. Accordingly, the waterproof function of the junction box becomes better.

A further objective of the present invention is to provide the aforementioned junction box. A specific distance is formed between the top of an annular flange of a first hollow cylinder and the top of an annular groove of a second hollow cylinder, and the specific distance is smaller than an axial feeding amount of the first thread when being threaded by one turn. Accordingly, a space for receiving the waterproof air-permeable membrane is provided. By means of the specific distance, the waterproof air-permeable membrane can be fixed appropriately and the first thread of the first hollow cylinder and the second thread of the second hollow cylinder can be prevented from being excessively threaded to squeeze and distort the waterproof air-permeable membrane to cause damage.

BRIEF DESCRIPTION OF THE SEVERAL VIEWS OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE INVENTION

Figure 1:
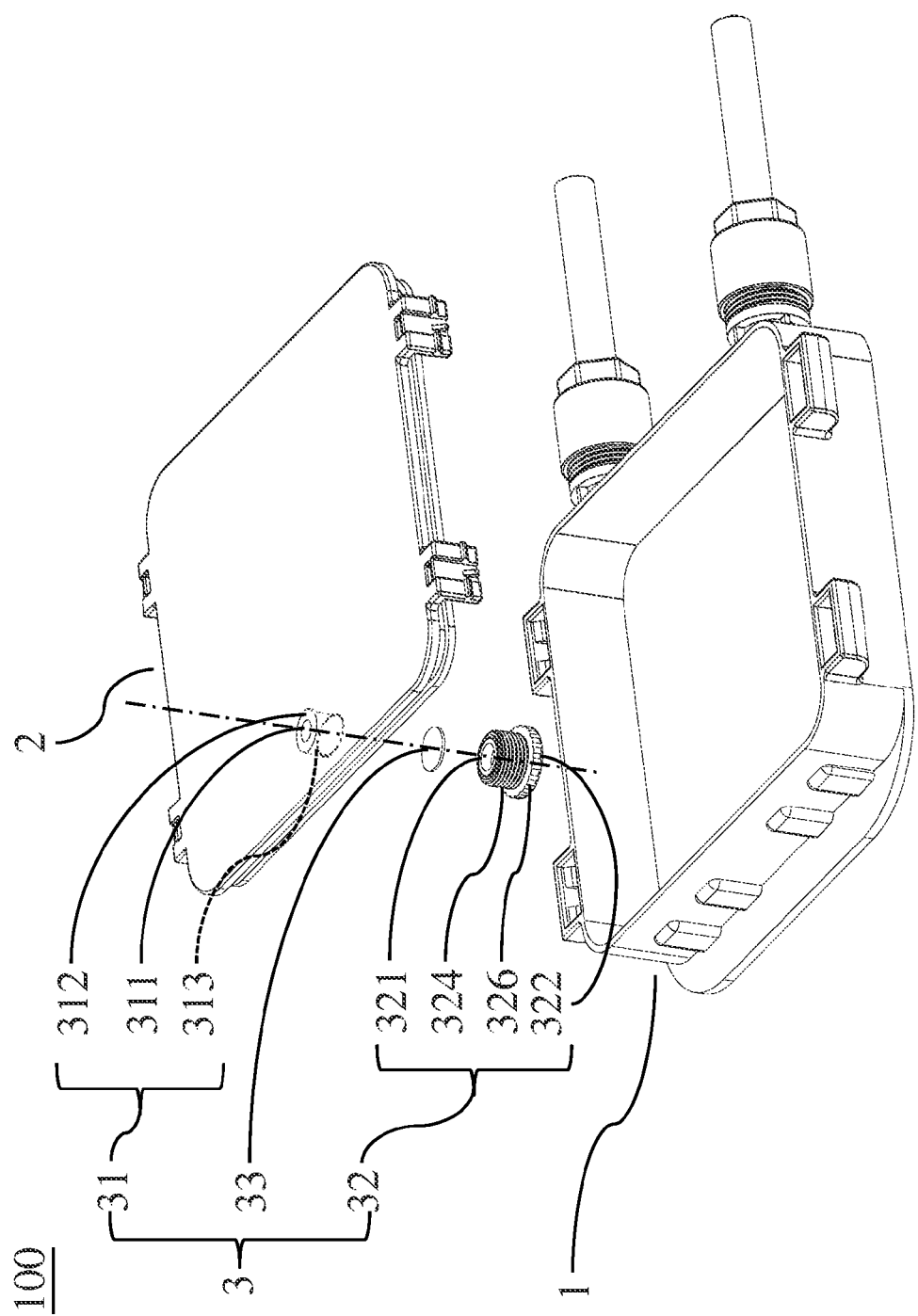
FIG. 1 is an exploded view of a junction box according to a preferred embodiment of the present invention.

Referring to FIG. 1, there is shown an exploded view of a junction box 100 according to a preferred embodiment of the present invention. The junction box 100 mainly comprises a base 1, a cover 2 and a ventilation valve 3. The cover 2 is snap-fitted into the base 1, and the ventilation valve 3 is disposed on the cover 2. The ventilation valve 3 is disposed primarily for purpose to have air pressure balanced between the inside and the outside of the junction box 100.

Figure 2:
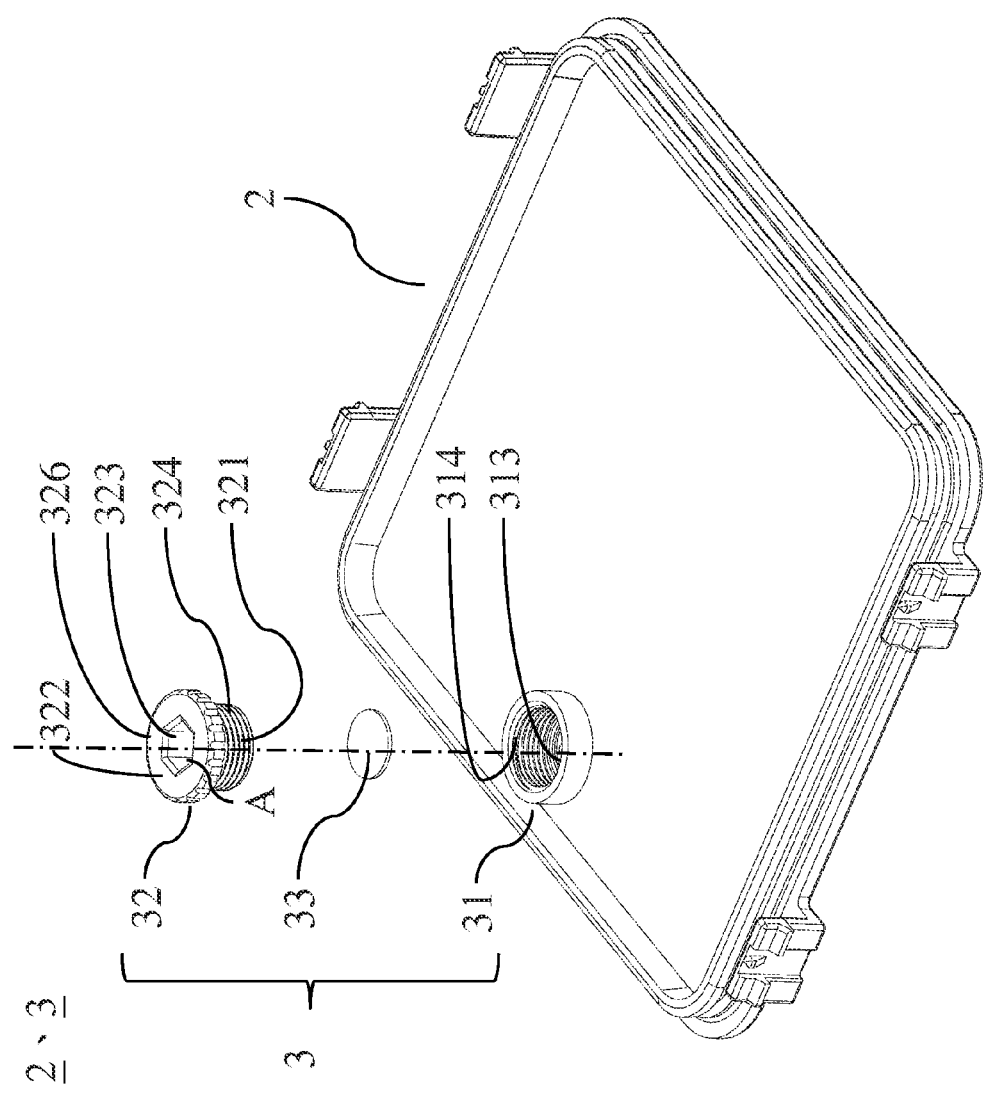
FIG. 2 is an exploded view of a cover and a ventilation valve of the junction box according to the preferred embodiment of the present invention.

Referring to FIG. 2 together, there is shown an exploded view illustrating that the ventilation valve 3 is disposed on an inner surface of the cover 2. The ventilation valve 3 further comprises a first hollow cylinder 31, a second hollow cylinder 32 and a waterproof air-permeable membrane 33. The first hollow cylinder 31 is disposed on the inner surface of the cover 2 and faces towards the base 1. The first hollow cylinder 31 has a first inner bore 313 and a bottom 312. The bottom 312 is provided with an open area 311, and the first inner bore 313 is larger in area than the open area 311. Since the junction box 100 needs to have a waterproof function, the cover 2 snap-fitted in the base 1 must be well sealed. However, if the space inside the junction box 100 is enclosed, the air pressures inside and outside the junction box 100 would be different due to temperature variations. In particular, the junction box 100 would have an overhigh air pressure therein when being heated, which may cause cracks on the junction box 100 to affect the waterproof performance thereof. Therefore, the open area 311 is disposed primarily for purpose of air ventilation to adjust the difference between the air pressures inside and outside the junction box 100. The open area 311 of the first hollow cylinder 31 is not limited in form as long as it delivers the air ventilation function. For example, the open area 311 may be an opening, and preferably a circular opening, or may be a plurality of pores. Furthermore, the position of the open area 311 of the first hollow cylinder 31 is also not particularly limited, and may be varied as desired based on considerations of the manufacturing cost, die sinking or the space. Preferably, the open area 311 is disposed at the center of the bottom 312 of the first hollow cylinder 31.

Figure 3:
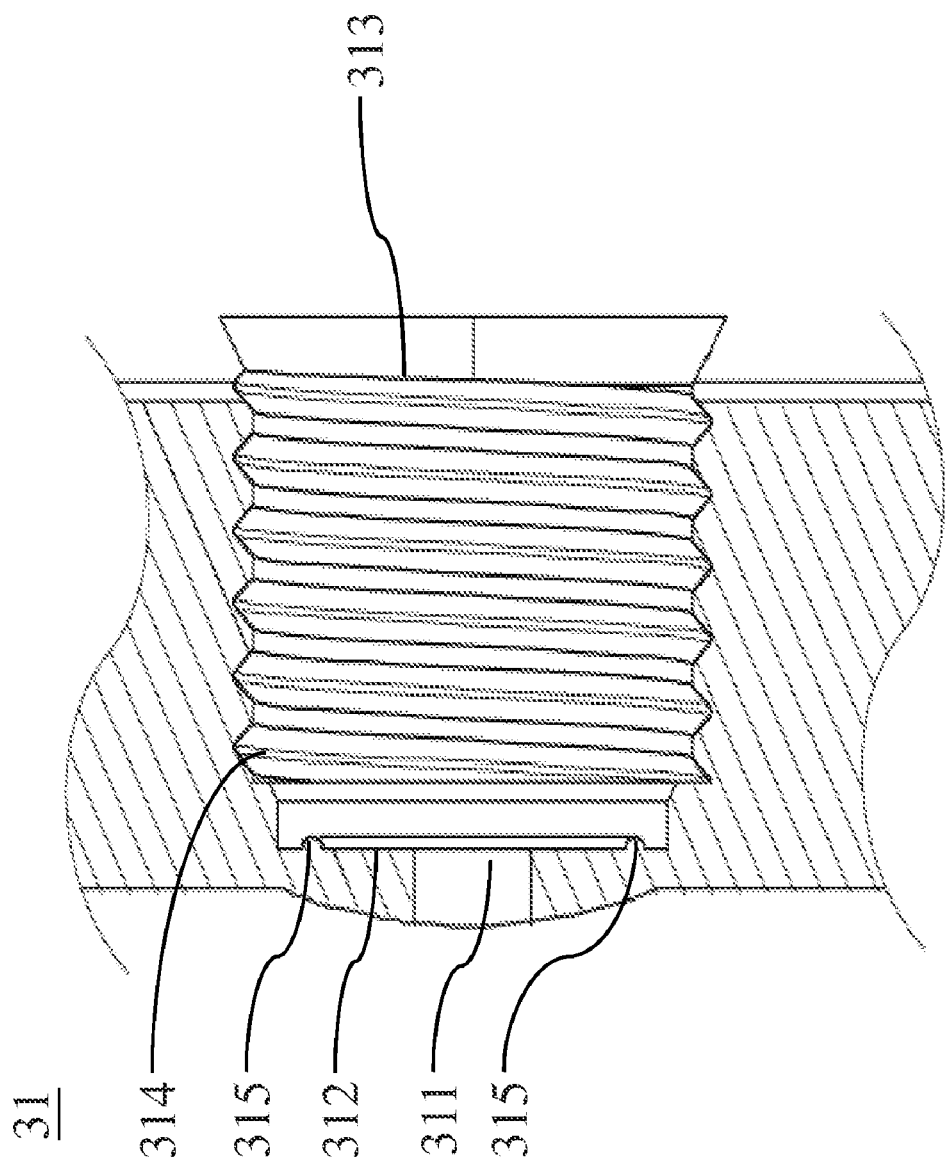
FIG. 3 is a cross-sectional view of a first hollow cylinder of the ventilation valve of the junction box according to the preferred embodiment of the present invention.

Referring to FIG. 3, there is shown a cross-sectional view of the first hollow cylinder 31 of the ventilation valve 3 of the junction box 100. The first inner bore 313 of the first hollow cylinder 31 is formed with a first thread 314 on a bore wall thereof, and the bottom 312 is formed with an annular flange 315 that is protruded axially on the outside of the open area 311.

Figure 4:
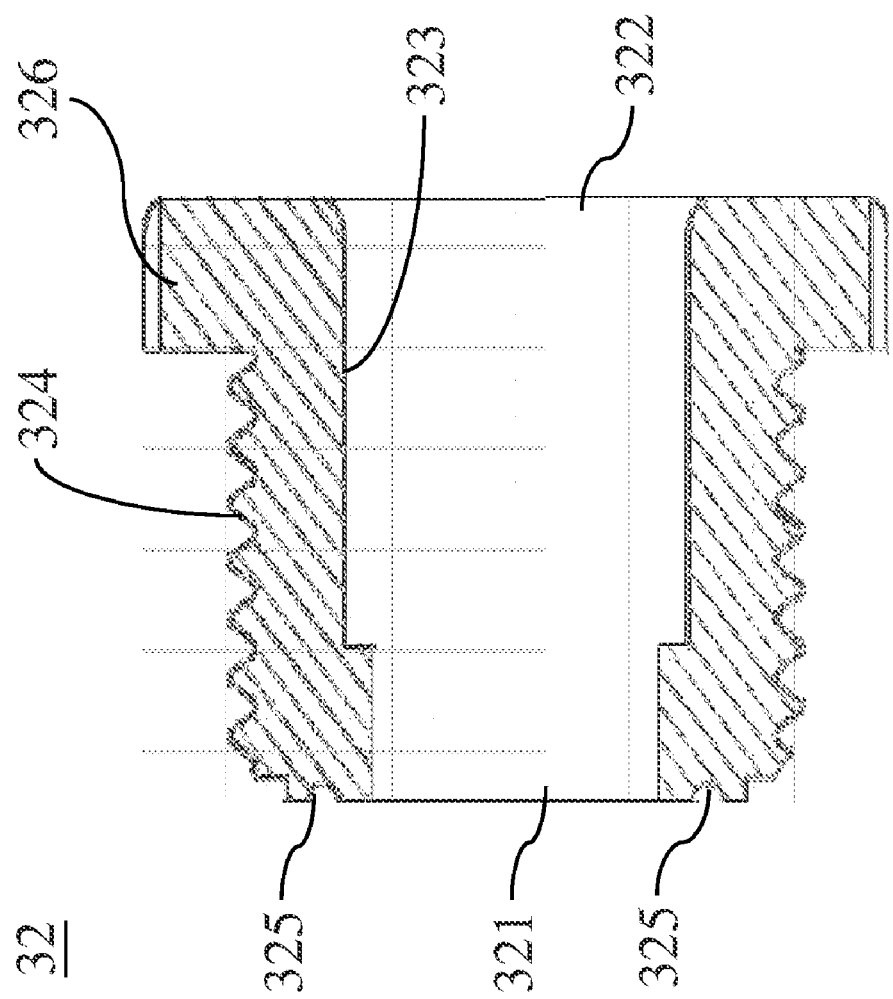
FIG. 4 is a cross-sectional view of a second hollow cylinder of the ventilation valve of the junction box according to the preferred embodiment of the present invention.

Referring to FIG. 4, there is shown a cross-sectional view of the second hollow cylinder 32 of the ventilation valve 3 of the junction box 100. The second hollow cylinder 32 is formed with a second thread 324 on an outer surface thereof, and the second hollow cylinder 32 has a first end 321, a second end 322 and a second inner bore 323 extending through the first end 321 and the second end 322. The first end 321 is formed with an annular groove 325 axially.

Figure 5:
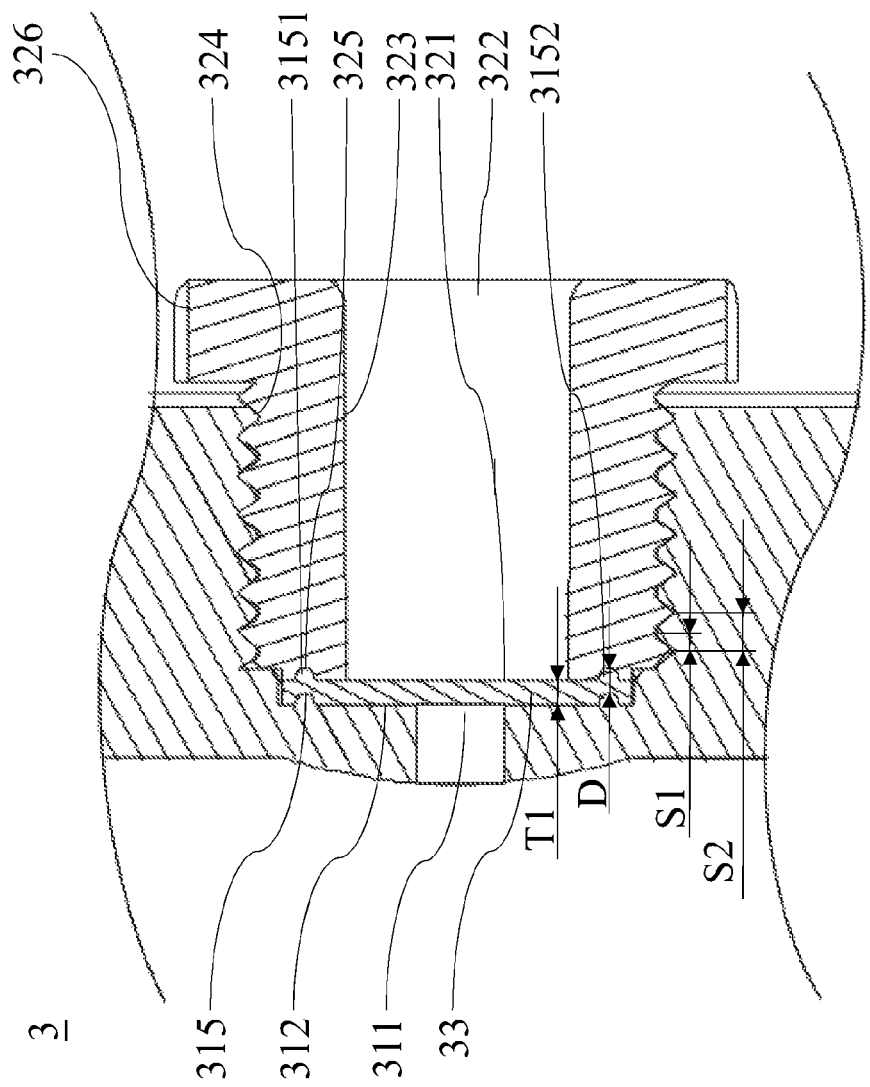
FIG. 5 is a cross-sectional view of the ventilation valve of the junction box according to the preferred embodiment of the present invention.

Referring next to FIG. 5, there is shown a cross-sectional view of the ventilation valve 3 of the junction box 100. The annular groove 325 of the first end 321 of the second hollow cylinder 32 is disposed corresponding to the annular flange 315 of the first hollow cylinder 31. Two projections 3151 and 3152 are fixed at two ends of the annular flange 315 respectively, and the projections 3151 and 3152 extend into the annular groove 325. Moreover, by threading the second thread 324 of the second hollow cylinder 32 into the first thread 314 of the first hollow cylinder 31, the second hollow cylinder 32 is received in the first hollow cylinder 31. Accordingly, the waterproof air-permeable membrane 33 is disposed between the first end 321 of the second hollow cylinder 32 and the bottom 312 of the first hollow cylinder 31, and is adhered to the first end 321 of the second hollow cylinder 32 mainly for purpose to ensure that when the second thread 324 of the second hollow cylinder 32 is threaded along the first thread 314 of the first hollow cylinder 31, the waterproof air-permeable membrane 33 can be fixed without any shift. Furthermore, there is no particular limitation on the way in which the waterproof air-permeable membrane 33 is adhered to the first end 321 of the second hollow cylinder 32; here, an adhesive may further be disposed between the waterproof air-permeable membrane 33 and the first end 321 of the second hollow cylinder 32 so that, apart from facilitating the alignment, the waterproof air-permeable membrane 33 can be adhesively fixed to the second hollow cylinder 32.

Furthermore, the annular groove 325 of the second hollow cylinder 32 is larger in width than the annular flange 315 of the first hollow cylinder 31 so that when the second hollow cylinder 32 is received in the first hollow cylinder 31, the annular flange 315 and the waterproof air-permeable membrane 33 can extend into the annular groove 325.

For the ventilation valve 3 of the junction box 100 of the present invention, the annular flange 315 of the first hollow cylinder 31 and the annular groove 325 of the second hollow cylinder 32 are disposed axially along the outside of the open area 311, so the waterproof air-permeable membrane 33 can be fixed axially on the outside of the open area 311 so that the open area 311 of the ventilation valve 3 of the junction box 100 of the present invention is completely covered by the waterproof air-permeable membrane 33. Thereby, a waterproof and air-permeable effect is achieved for the junction box 100. In other words, the air pressure is balanced between the inside and the outside of the junction box 100, and moisture is prevented from entering into the junction box 100 through the open area 311. The material of the waterproof air-permeable membrane 33 is not limited, and preferably, is a porous resin membrane with high waterproofness and high air-permeability.

It shall be particularly appreciated that, according to the present invention, the first thread 314 of the first hollow cylinder 31 is threaded along the second thread 324 of the second hollow cylinder 32 to be mated with each other; each time the second thread 324 is threaded along the first thread 314 by one more turn, the mating of the first thread 314 and the second thread 324 with each other becomes stronger; and the waterproof air-permeable membrane 33 can be fixed and prevented from shifting when being disposed between the first end 321 of the second hollow cylinder 32 and the bottom 312 of the first hollow cylinder 31. In this way, the junction box 100 may also be made to have a better waterproof function. In other words, the waterproof capability can be further enhanced through each turn of mating of the first thread 314 and the second thread 324 with each other.

It is important that a specific distance D is formed between the top of the annular flange 315 of the first hollow cylinder 21 and the top of the annular groove 325 of the second hollow cylinder 32, and the specific distance D is smaller than an axial feeding amount S1 of the first thread 314 of the first hollow cylinder 31 when being threaded by one turn. Preferably, the specific distance D is smaller than an axial feeding amount S2 of the first thread 314 when being threaded by a half turn. By means of the specific distance D formed between the top of the annular flange 315 and the top of the annular groove 325, the waterproof air-permeable membrane 33 can be fixed appropriately and the first thread 314 of the first hollow cylinder 31 and the second thread 324 of the second hollow cylinder 32 can be prevented from being excessively threaded to squeeze and distort the waterproof air-permeable membrane 33 to cause damage. The waterproof air-permeable membrane 33 has a thickness T1, which is larger than the specific distance D.

Further, in order to facilitate the operation of mating the first hollow cylinder 31 and the second hollow cylinder 32 of the ventilation valve 3 with each other, a second flange 326 may extend radially from the second end 322 of the second hollow cylinder 32 of the ventilation valve 3 for use during manual operation, and the second flange 326 is formed with embossed patterns on an outer surface thereof for anti-skid purpose. Alternatively, the second inner bore 323 of the second hollow cylinder 32 is formed with an operational structure A at the second end 322 in order to facilitate operation with a tool, and the operational structure A may be of a hexagonal form (as shown in FIG. 2), a cruciform form or a linear form.

The invention claimed is:

1. A junction box (100), mainly comprising a base (1) and a cover (2) snap-fitted into the base (1), being characterized in that, the cover (2) is further provided with a ventilation valve (3), and the ventilation valve (3) comprises a first hollow cylinder (31), a second hollow cylinder (32) and a waterproof air-permeable membrane (33), therein the first hollow cylinder (31) being disposed on an inner surface of the cover (2) and faces towards the base (1), the first hollow cylinder (31) having a first inner bore (313) and a bottom (312), the bottom (312) being provided with an open area (311), the first inner bore (313) being larger in area than the open area (311), the first inner bore (313) being formed with a first thread (314) on a bore wall thereof, and the bottom (312) being formed with an annular flange (315) that is protruded axially on the outside of the open area (311);

the second hollow cylinder (32) being formed with a second thread (324) on an outer surface thereof to be threaded into the first thread (314) so that the second hollow cylinder (32) is received in the first hollow cylinder (31), the second hollow cylinder (32) having a first end (321), a second end (322) and a second inner bore (323) extending through the first end (321) and the second end (322), an annular groove (325) being disposed axially at the first end (321) corresponding to the annular flange (315) of the first hollow cylinder (31), and the annular groove (325) being larger in width than the annular flange (315);

the waterproof air-permeable membrane (33) being disposed between the first end (321) of the second hollow cylinder (32) and the bottom (312) of the first hollow cylinder (31), and being adhered to the first end (321) of the second hollow cylinder (32); and the annular flange (315) comprising two projections (3151, 3152) being fixed at two ends of the annular flange (315) respectively, the projections (3151, 3152) extending into the annular groove (325), and a specific distance (D) being formed between the top of the annular flange (315) and the top of the annular groove (325), with the specific distance (D) being smaller than an axial feeding amount (S1) of the first thread (314) when being threaded by one turn.

2. The junction box (100) of claim 1, wherein the specific distance (D) is smaller than an axial feeding amount (S2) of the first thread (314) when being threaded by a half turn.

3. The junction box (100) of claim 1, wherein the waterproof air-permeable membrane (33) has a thickness (T1) which is larger than the specific distance (D).

4. The junction box (100) of claim 1, wherein an adhesive is further disposed between the waterproof air-permeable membrane (33) and the first end (321) of the second hollow cylinder (32).

5. The junction box (100) of claim 1, wherein the open area (311) of the bottom (312) of the first hollow cylinder (31) is an opening.

6. The junction box (100) of claim 5, wherein the opening is a circular opening.

7. The junction box (100) of claim 1, wherein the open area (311) of the bottom (312) of the first hollow cylinder (31) is a plurality of pores.

8. The junction box (100) of claim 1, wherein the open area (311) of the bottom (312) of the first hollow cylinder (31) is at a center of the bottom (312).

9. The junction box (100) of claim 1, wherein a second flange (326) extends radially from the second end (322) of the second hollow cylinder (32).

10. The junction box (100) of claim 9, wherein the second flange (326) is formed with embossed patterns on an outer surface thereof.

11. The junction box (100) of claim 1, wherein the second inner bore (323) of the second hollow cylinder (32) is formed with an operational structure (A) at the second end (322).

12. The junction box (100) of claim 11, wherein the operational structure (A) is of a hexagonal form.

13. The junction box (100) of claim 11, wherein the operational structure (A) is of a cruciform form.

14. The junction box (100) of claim 11, wherein the operational structure (A) is of a linear form.

* * * * *